United States Patent [19]

Gill

[11] Patent Number: 5,396,398
[45] Date of Patent: Mar. 7, 1995

[54] PORTABLE CONTROL CONSOLE

[75] Inventor: Randolph C. Gill, Tempe, Ariz.

[73] Assignee: Fender Musical Instruments Corporation, Scottsdale, Ariz.

[21] Appl. No.: 171,917

[22] Filed: Dec. 21, 1993

[51] Int. Cl.⁶ .............................................. H05K 5/00
[52] U.S. Cl. ..................................... 361/679; 84/117; 84/DIG. 3; 84/DIG. 17; 108/119; 248/461; 312/244; 312/317.3; 361/610; 361/625; 361/726
[58] Field of Search ...................... 108/119; 190/11, 7, 190/16, 107; 206/45.2, 45.23, 45.24; 84/171–180, 352–354, 423 B, 431, DIG. 3, DIG. 17; 248/461; 307/150; 312/244, 258, 313–315, 317.3; 361/610, 622, 625, 627, 679, 725–727, 829; 455/347–348

[56] References Cited

U.S. PATENT DOCUMENTS

| | | | |
|---|---|---|---|
| 2,231,235 | 2/1941 | Weir | 84/DIG. 3 |
| 3,298,478 | 1/1967 | Soprani | 190/11 |
| 4,380,947 | 4/1983 | Nishimoto | 84/176 |
| 4,488,468 | 12/1984 | Peterson et al. | 84/DIG. 3 |
| 4,635,521 | 1/1987 | Bellini | 84/177 |
| 4,641,565 | 2/1987 | Tachida et al. | 84/DIG. 3 |

Primary Examiner—Gregory D. Thompson
Attorney, Agent, or Firm—Allan Rothenberg

[57] ABSTRACT

An audio mixer console and a power amplifier are mounted in a self contained carrying case that provides both protection for the console and amplifier during transportation and storage and a support during use. A power amplifier is fixedly connected between lower portions of first and second spaced sides at the upper end of which is pivoted a front section of the mixer console. In stored position the mixer console extends downwardly between the sides to a position adjacent the amplifier, and a detachable cover is secured to the sides to extend over both the mixer console and amplifier. Parts of the mixer console and amplifier form at least portions of a forward cover of the completed carrying case. For use of the mixer console and amplifier the detachable cover is detached, the mixer console is pivoted upwardly and rearwardly, and the detached cover is inserted between the case sides at an acute angle to the sides, to provide an "X" shaped support configuration, so that an upper part of the cover supports the outwardly and rearwardly extending rear section of the mixer console and a bottom part of the cover contacts the ground to cooperate with the lower portions of the sides to form an extended support base for the assembly.

19 Claims, 6 Drawing Sheets

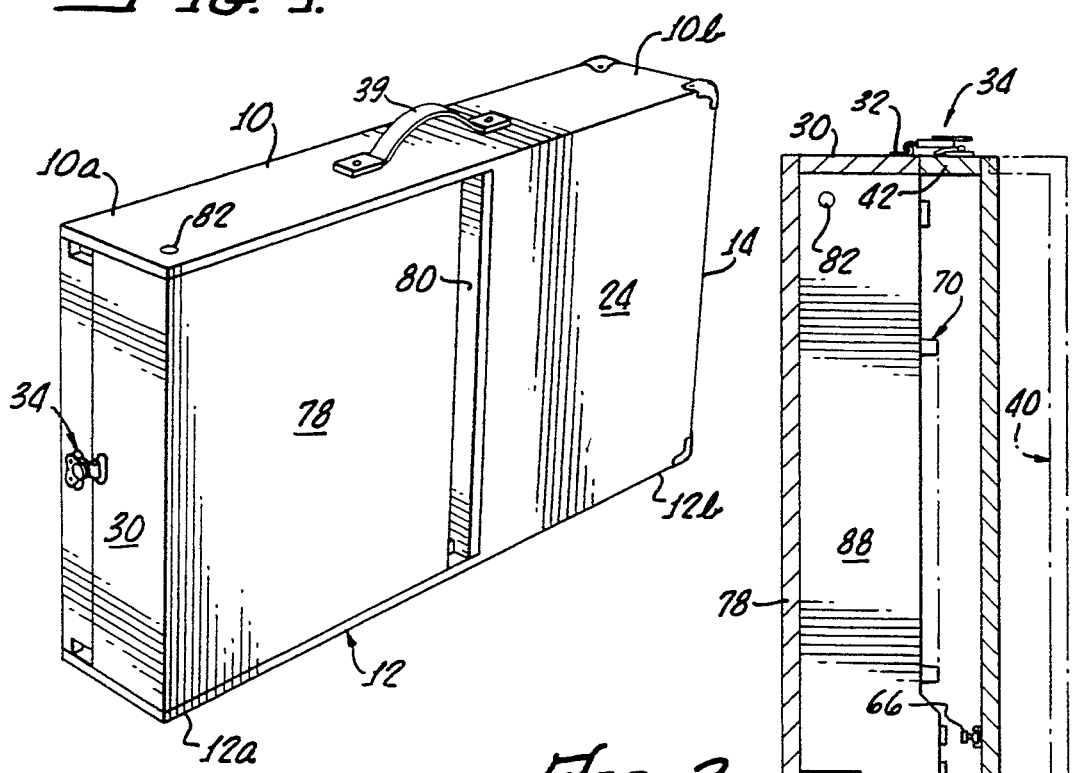
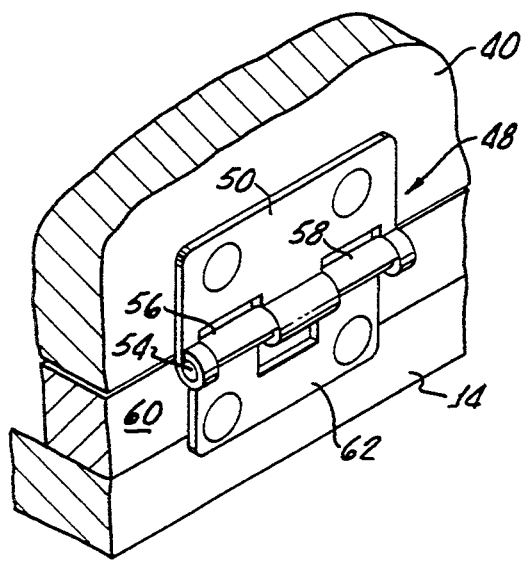

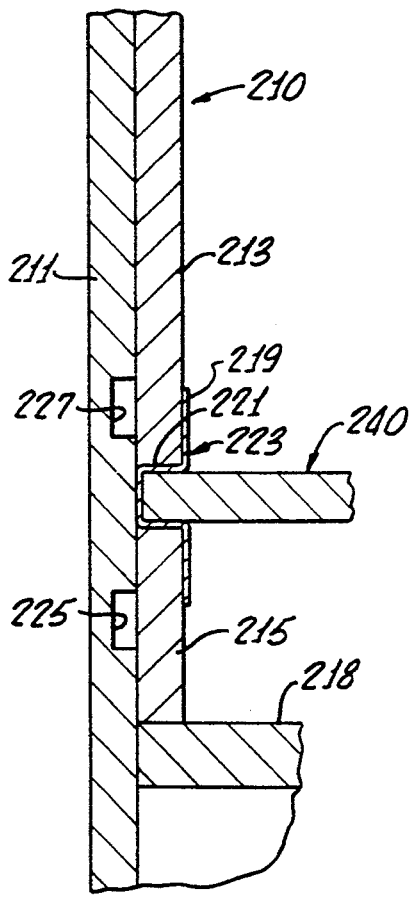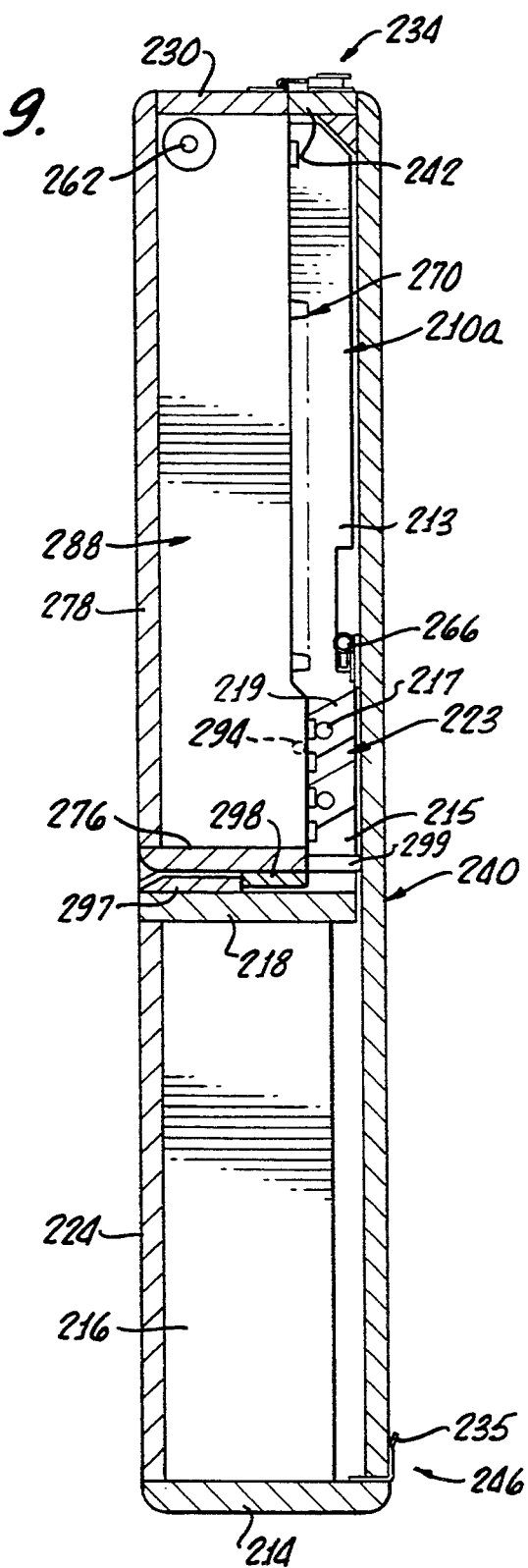
FIG. 9.
FIG. 10.

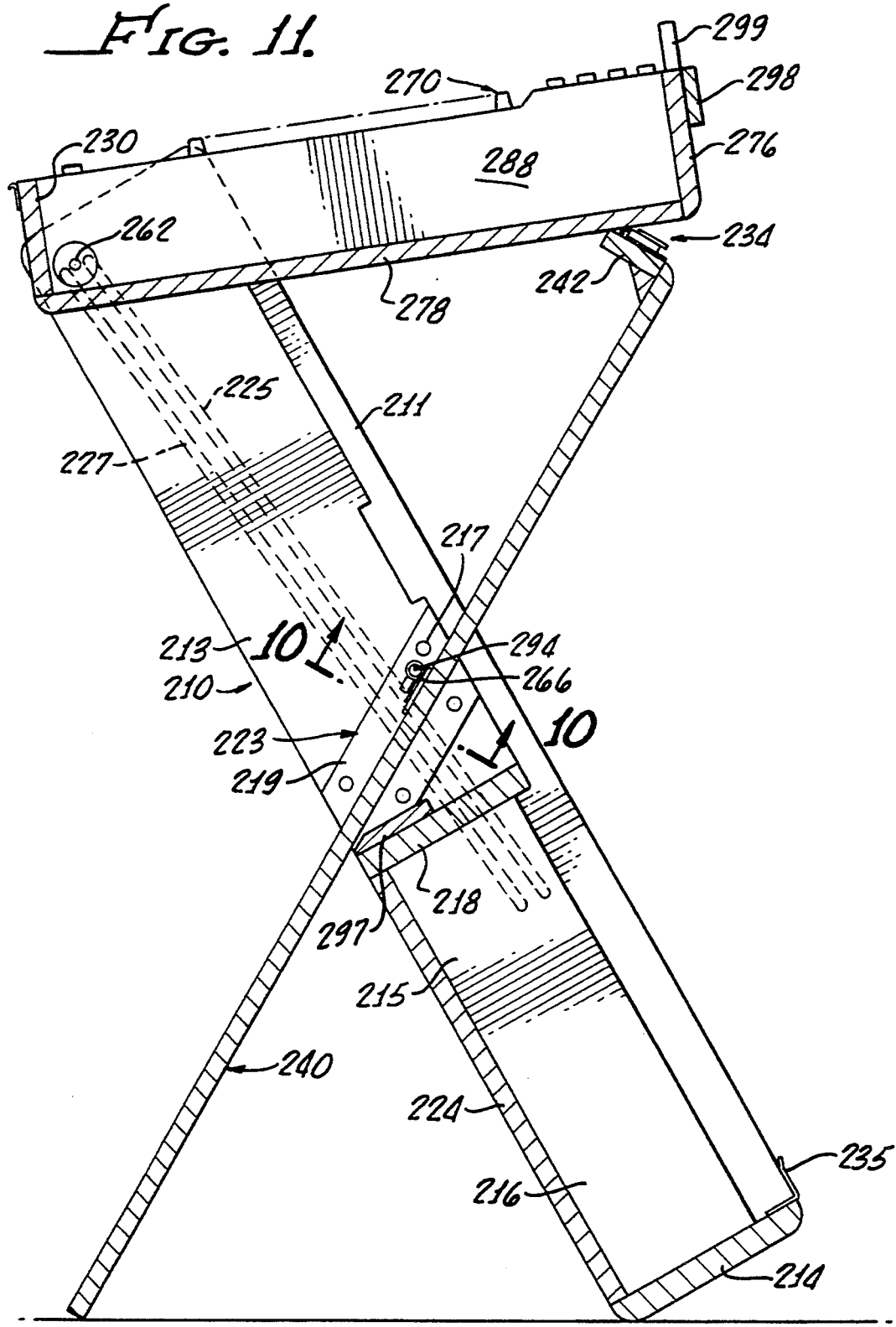

005,396,398

PORTABLE CONTROL CONSOLE

BACKGROUND OF THE INVENTION

1. Field of the Invention

The present invention relates to portable instruments and more particularly concerns a portable control console that is self contained for transportation and storage and is self supporting for operation.

2. Description of Related Art

Traveling musical groups of instrumental and vocal artists generally employ electronic instrumentation in the form of loudspeakers, power amplifiers and pre-amplifiers, and microphones. Sound received by several microphones, and, at times, sound produced by auxiliary sound sources, are electronically combined and mixed in an electronic mixing console, fed through a pre-amplifier and power amplifier, and thence to loudspeakers for presentation of the music to an audience.

In addition to loudspeakers, the instrumental and vocal group will carry with it a power amplifier and pre-amplifier and an electronic mixing console. Loudspeakers are plugged into the amplifier and microphones or other auxiliary sound sources are plugged into the mixing console, to allow the operator of the console to selectively control amplification of each of the input sound sources and to mix these in desired proportions. Frequently the amplifier and mixing console are mounted in suitable carrying cases, and at the site of the performance are removed from the cases and set up for use. The console is conveniently placed on some suitable surface, such as a table top, and the amplifier, after removal from its case, is frequently placed on the floor. The equipment is large, heavy and bulky and at least the mixer console must be set up on a table at the performance location. Thus, the performing group not only must carry its instrumentation and electronic equipment, but also must either carry or provide at the performing site suitable supporting structures for the mixing console and amplifier. The requirement for several different pieces, separate supports and separate carrying cases greatly complicates the problem of transporting and handling the equipment.

Accordingly, it is an object of the present invention to provide transportable equipment that avoids or eliminates above mentioned problems.

SUMMARY OF THE INVENTION

In carrying out principles of the present invention in accordance with a preferred embodiment thereof, a mixing control console and a power amplifier are mounted within and effectively form part of a carrying case which also can be manipulated to provide a suitable operating support for both the amplifier and the control console. The control console is pivoted between upper portions of a pair of mutually spaced sides so as to be movable between a stored position in which a rear section of the control console extends between the sides adjacent the amplifier and an operable position in which the control console rear section extends rearwardly beyond the sides. A back cover is movably connected to the rear edges of the sides in a closed position in which it extends between the sides and over both the control console and the amplifier. The back cover is connected to the sides so as to be movable between the closed position and a support position in which part of the cover extends rearwardly beyond the rear edges of the sides and provides a support for the rearwardly extending rear section of the control console in its operable position. In one embodiment the back cover is detachably connected to the sides and is moved to extend between the sides to form an "X" shaped assembly in which the top of the cover supports the rearwardly extending rear of the console section, and in which the bottom of the cover cooperates with the bottom of the sides to form a stable base. In another embodiment the back cover, rather than being detachable, is formed in two longitudinally split halves, each of which is pivoted to a rear edge of one of the sides and movable between a closed position and a rearwardly extending open position so that the pivoted console, when its rearward section is pivoted upwardly and rearwardly, can rest on brackets carried on inner sides of the rearwardly extending cover halves.

BRIEF DESCRIPTION OF THE DRAWINGS

FIG. 1 is a pictorial illustration of a control console and amplifier assembly with a self-contained carrying case in stored position for handling and transportation.

FIG. 2 is a cross-section of the assembly of FIG. 1 in upright position, with the cover shown in dotted lines in a detached position.

FIG. 5 shows details of a detachable hinge connection at the bottom of the cover.

FIG. 9 shows still another modification of the assembly in stored position for transportation and handling.

FIG. 10 is a partial sectional detail, taken on lines 10—10 of FIG. 11, showing construction of one of the sides of the case.

FIG. 11 shows the assembly of FIGS. 9 and 10 set up in its support position.

DETAILED DESCRIPTION OF THE PREFERRED EMBODIMENTS

Figure 3:
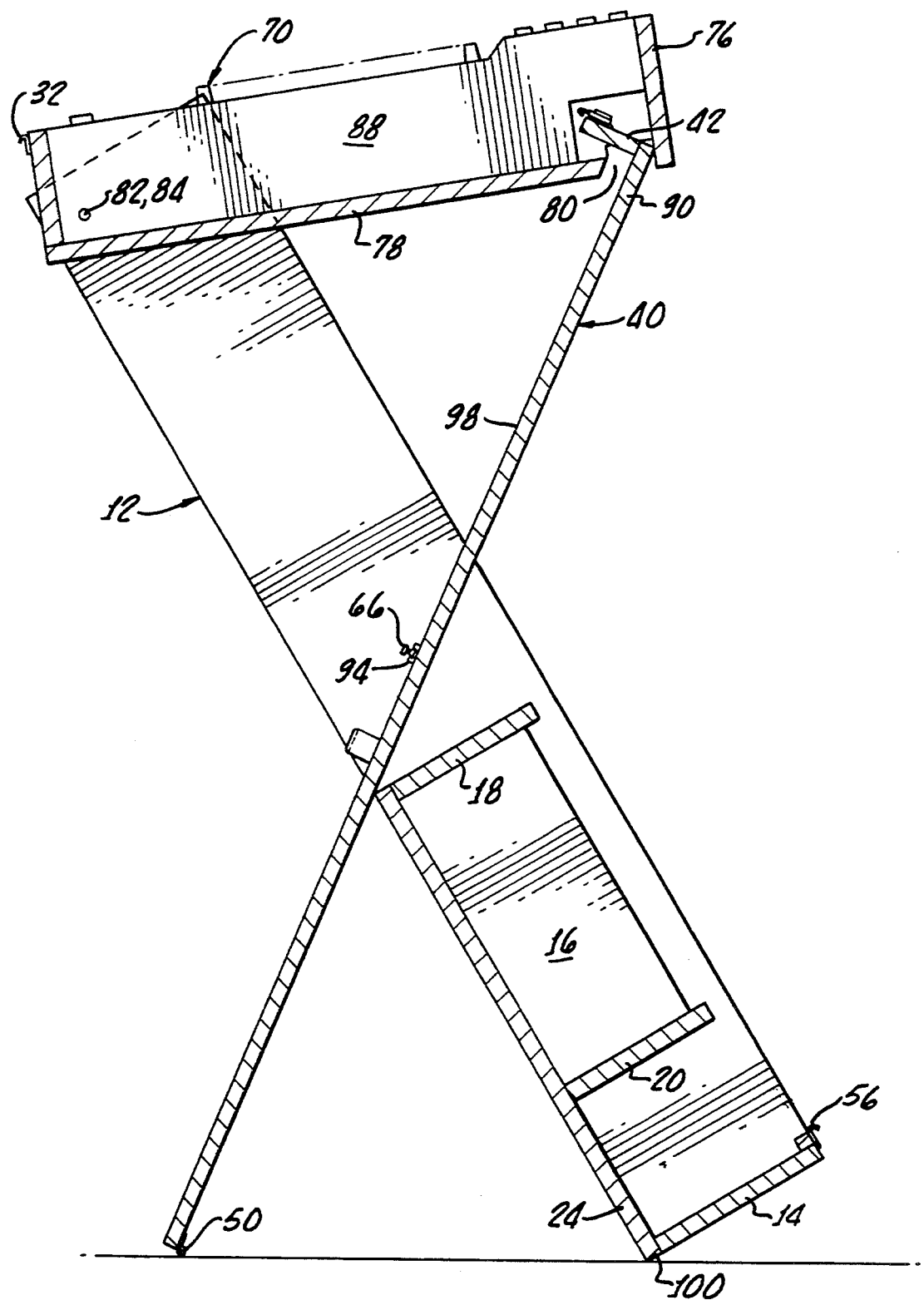
FIG. 3 shows a cross section of the assembly set up in its support position.

FIGS. 1 and 2 illustrate the mixer console assembly in its closed position for handling and transportation. The assembly comprises a substantially completely closed case, including first and second parallel and mutually rigid spaced sides 10,12, having upper (as seen in the position of FIG. 2) portions 10a,12a and lower portions 10b,12b, to which is rigidly interconnected a fixed lower or bottom wall 14. Between the lower sections 10b,12b of the sides is fixedly mounted a power amplifier 16 (FIGS. 2 and 3) having upper and lower case walls 18,20 which are fixed to and extend between the sides 10,12 and are also rigidly fixed to an outer wall 24, which itself is rigidly secured to both sides 10,12. Part of outer wall 24 forms a front of the amplifier casing. Lower wall 14 is secured to the lower ends of each of the two sides and to the lower end of the outer wall 24. A control console housing 88 includes top and bottom walls 30 and 76 fixed to a housing back wall 78 and housing side walls 72,74 (see also FIG. 4). The control console housing is pivoted to the case sides as will be described below. Housing top wall 30 carries at a rearward edge one part 32 of a detachable latch 34. A back cover 40, in the form of a continuous rectangular sheet of rigid material, includes an inwardly protruding flange 42 at an upper end thereof. To the flange 42 is fixed a second part of latch 34 for cooperation with the first latch part 32 fixed to housing top wall 30. A carrying handle 39 is fixed to side 10 so that the closed assembly may be carried like a suitcase.

The lower edge of cover 40 is hingedly and detachably connected to the lower wall 14 by means of a pair of spaced detachable hinges 48. Each of hinges 48 (see FIG. 5) includes a first hinge plate 50 fixed to cover 40 and bearing a fixed hinge pin 54. Intermediate portions of the hinge pin are captured within and below downwardly curved and downwardly open semicircular hinge sleeves 56,58 that are fixedly carried by a second hinge plate 62 that is secured to the case lower wall 14 and to a fixed hinge support bar 60, which itself is fixed to the case lower wall 14.

Figure 4:
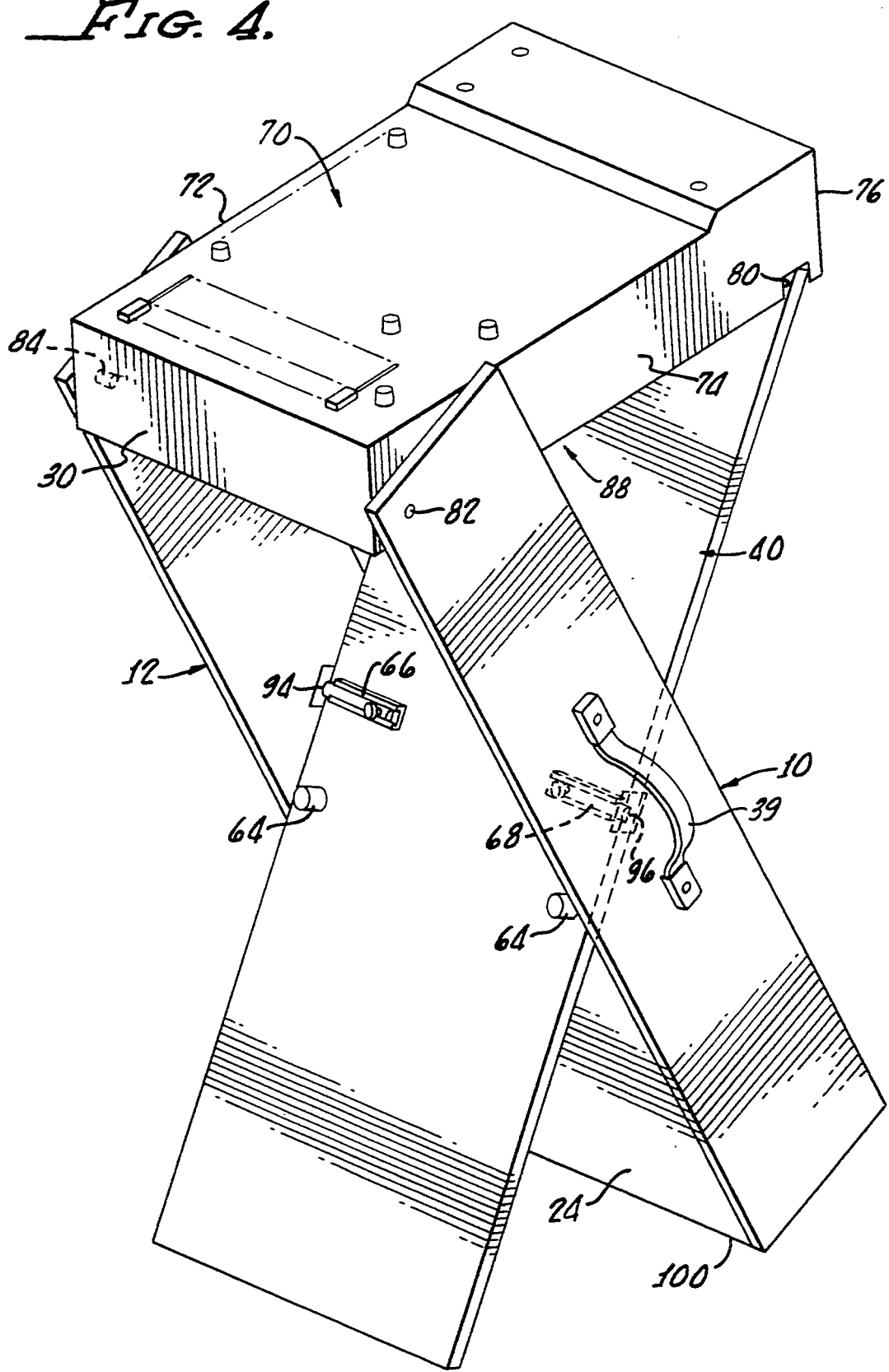
FIG. 4 is a pictorial illustration of the assembly in its support position.

The cover includes an inwardly projecting, transversely extending stop and stiffening bar 64 extending across the inner surface of an intermediate portion thereof and also mounts, on opposite edges of an intermediate portion, first and second laterally outwardly sliding latch bolts 66,68 (FIG. 4). These latch bolts perform no useful function when the cover is in the closed position illustrated in FIGS. 1 and 2 but help to hold the cover in the operable position of FIGS. 3 and 4. In the position of FIGS. 1 and 2 the cover is held in place by the detachable hinge 48 and the detachable latch 34, which may be, for example, a conventional over-center suitcase type of latch. The arrangement allows the cover 40 to be completely detached from the remainder of the case simply by disconnecting the latch 34 at the top of the assembly, pivoting the upper portion of the cover (as viewed in FIG. 2) downwardly about its hinge 48 and then simply lowering the lower edge of the cover and its hinge plate down to free the hinge pin 54 from the half open hinge sleeves 56,58. FIG. 2 illustrates the cover in fully detached position in dotted lines.

An audio mixer control console 70 is mounted in the console housing 88 between housing sidewalls 72,74, bottom wall 76 and top wall 30 of the housing, which are all rigidly connected to one another. The mixer console housing 88 has its back wall 78 cut away at a lowermost portion (see FIGS. 2, 3 and 4) to provide an opening 80 for purposes to be described hereinafter.

Power amplifier 16 is fixedly secured to the sides and outer wall 24 of the assembly. Outer wall 24 extends only from the bottom of the case assembly to the bottom wall 76 of the mixer console housing 88. The mixer console housing bottom wall 76, in the closed stored position illustrated in FIG. 2, is spaced slightly above the upper wall 18 of the fixed amplifier 16. Housing sidewalls 72,74 of the mixer console housing are pivoted to the upper portions of the case side portions 10a and 12a on mutually aligned horizontal (as viewed in FIGS. 2 through 4) pivots 82,84. The mixer console housing 88 is mounted to move on its pivots to and from the stored position illustrated in FIG. 2. In this position the console housing lower (rear) portion extends downwardly between the sides of the assembly to a position adjacent the upper portion of the amplifier 16, as can be best seen in FIG. 2. The mixer console housing can move from this stored position to an upwardly and rearwardly extended operable position illustrated in FIGS. 3 and 4, wherein the upwardly and rearwardly projecting free end of the console housing will be supported by an upper end of the cover.

To rearrange the parts of the assembly from the stored and closed position of FIGS. 1 and 2 to the operable and support position of FIGS. 3 and 4, the assembly is placed on its lower end, in the upright position of FIG. 2. The cover 40 is then detached from the remainder of the assembly. This is accomplished, as previously described, by first releasing and detaching the parts of the latch 34 at the upper end of the assembly (as viewed in FIG. 2), then pivoting the cover downwardly until the hinge pin of hinge plate 50 that is fixed to the cover can clear the semicircular hinge sleeves 56,58. The plate 50 and its pin 54 then may be dropped from and disengaged from the hinge plate 62.

After removal of the cover 40, the rear section of the control console housing 88, which is the lower section when the console housing is in its stored position of FIG. 2, is pivoted upwardly and rearwardly to the position shown in FIGS. 3 and 4. This is most readily accomplished by using the cover to push the free (lower) end of the console housing rearwardly from between case sides 10,12.

The detached cover is inverted and moved around toward the front (left as seen in FIG. 2) of the assembly. Flange 42 on the end of the inverted cover is then inserted into the opening 80 at the lower end of the housing and the cover is used to push the housing upwardly and rearwardly to cause it to swing in a counterclockwise direction (as viewed in FIG. 3). As the housing lower end moves upwardly and rearwardly the cover slides between the two sides 10 and 12. The flange 42 of the cover is positioned in the opening 80 in back wall 78 of the control console so that the uppermost corner of the inverted cover presses against the console housing wall 76. Effectively, the upper portion of the inverted cover with its flange 42 is locked to and within the console housing through the opening 80. The width of the cover is substantially equal to, though slightly less than, the distance between facing surfaces of sides 10 and 12 so that the cover may be positioned between the two sides.

The sides 10,12 at an intermediate portion thereof are formed with inwardly facing holes 94,96 that respectively receive the outwardly slidable slide bolts 66,68 that are mounted on the inner surface 98 of the cover. As the console housing is pivoted up and to the rear, the cover slides between sides 10,12 until the slide bolts are aligned with the holes in the sides. These slide bolts are moved into the holes to detachably connect the cover to and between the sides 10,12. The assembly now provides an X shaped support, with the upper portion of the cover supporting the rearwardly and upwardly pivoted rear section of the control console housing and the lower portion of the cover, including detachable plate 50 or hinge 48, resting upon the floor. The cover contacts the floor at a distance spaced from a lower corner 100 formed by the intersection of lower wall 14 and amplifier outer wall 24 to provide a stable support base. In this position the amplifier 16 is spaced a relatively large distance from the audio mixer control console 70. This is a highly desirable arrangement because the relatively high power circuits of the amplifier are prone to emit electromagnetic radiation at 60 cycle and other frequencies. If the amplifier is too close to the console, the amplifier radiation will interfere with the mixing of relatively low level signals which are sensitive to such radiation from a close source.

It will be seen that the described mixer console assembly provides its own self-contained case for protection of the mixer console and amplifier during handling and transportation. The entire assembly is readily transported as a unitary piece of luggage. For use, the components are readily rearranged and can be set up in any location, needing no separate support or table to hold the components. The amplifier and mixer console, which are effectively built into the carrying case, form a part of the carrying case and are arranged so that the carrying case itself forms a support for these components. Thus the apparatus does not need a separate table and the user does not have to carry a separate table or a separate case together with the mixer console and amplifier. Moreover, the amplifier is generally formed of massive, heavy components and its location at the lowermost portion or base of the support assembly in its operable position provides enhanced stability for the support base of the equipment.

When use of the equipment in its operable position is completed the support is dismantled according to a set of steps that are the reverse of those employed to set up the support. Slide bolts 66,68 are withdrawn from the holes 94,96 in the two sides, the rear section of the control console housing is lowered by withdrawing the cover (while still in recess 80) until the console housing is back in its storage position. The cover flange is detached from the console housing and the two sides are positioned vertically or horizontally on a floor. The cover 40 is moved to the back of the assembly, and its detachable hinge plate 50 is then re-engaged with the fixed hinge plate 62. The cover is then pivoted upwardly so that its upper end, at the inner portion of flange 42, abuts the top wall 30 of the stored control console housing 88. Latch 34 is then locked into place to lock the cover and swingable mixing control console into their stored and closed position. A stop 19 is provided on the upper side of wall 18 to engage a rebated part 21 of housing bottom wall 76 to limit the swinging motion of the mixing console housing in a clockwise direction (as viewed in FIG. 3 to its stored position and to prevent the console swinging out beyond the forward edges of its sides 10 and 12.

Figure 6:
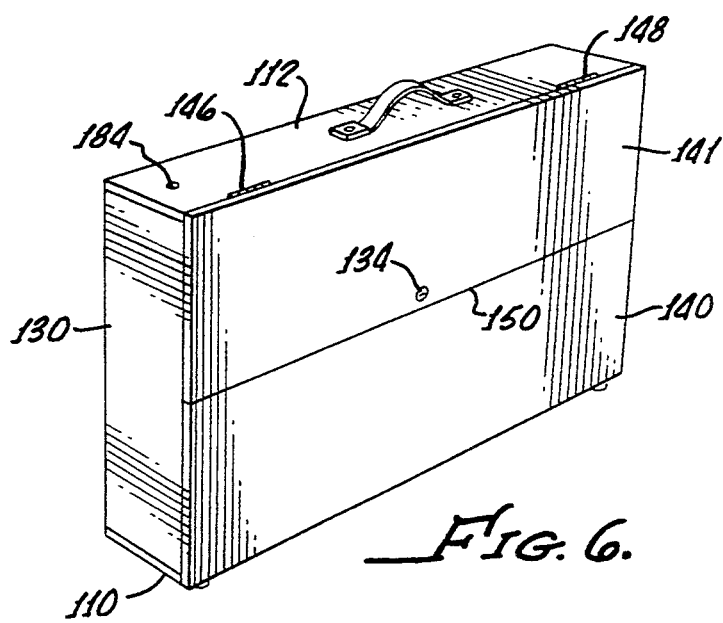
FIG. 6 is a pictorial view of a modification of the control console assembly in stored position for transportation and handling.
Figures 7, 8:
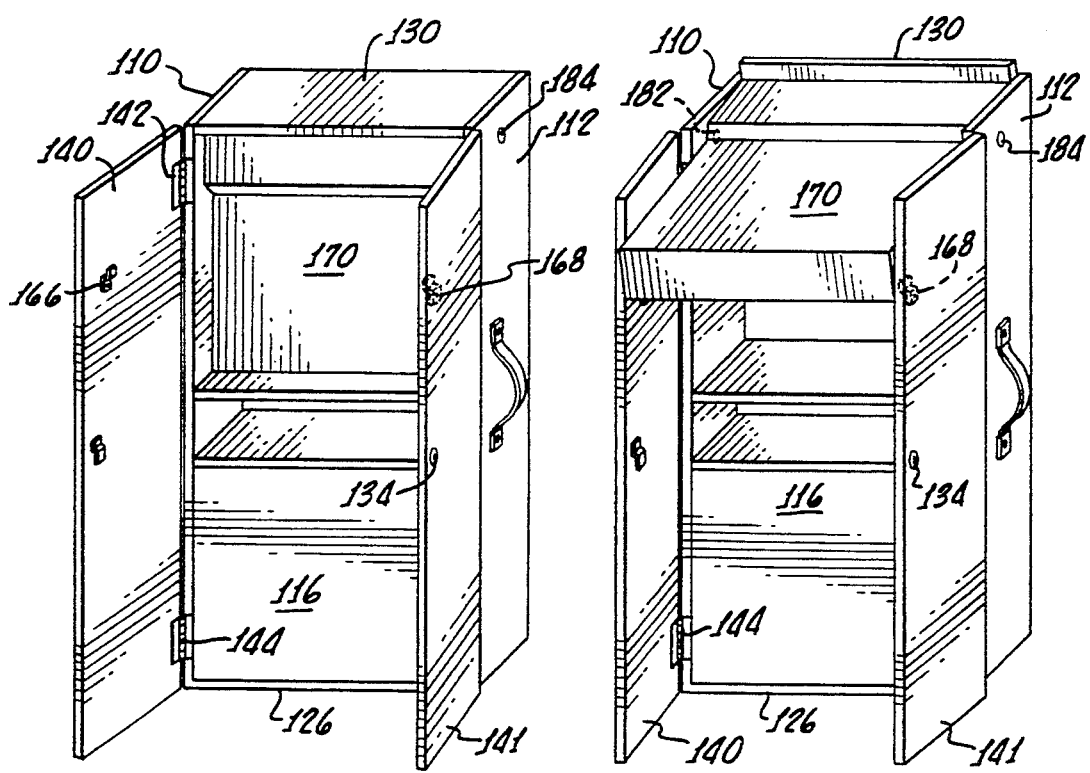
FIG. 7 shows the assembly of FIG. 6 partly open.
FIG. 8 shows the assembly of FIG. 6 in operable position with the cover parts pivoted outwardly and supporting the mixer console in operable position.

FIGS. 6, 7 and 8 illustrate an alternate arrangement of a self-supporting, self-contained case and support for the amplifier and control console. In the arrangements of FIGS. 6, 7 and 8, in a manner similar to the first embodiment, the assembly includes first and second sides 110,112, a console housing top 130 and a case bottom 126. In this arrangement the cover is formed of first and second cover door sections 140-141, which are respectively pivoted to, rear edges of sides 110 and 112 on hinge pairs 142,144 for cover section 140, and 146,148 for cover section 141. The two cover sections, in the closed position illustrated in FIG. 6, abut one another along their common edges 150 and may swing open about their vertical (as illustrated in FIGS. 7 and 8) hinges to the open supporting position shown in FIG. 7. In the position of FIG. 7 the fixed amplifier 116 is accessible and visible in the drawing, and the mixer console and its housing, collectively indicated at 170, are still in stored position. The two cover door sections 140,141 are in or close to their support position and extend rearwardly of and in substantial alignment with the respective sides to which they are pivoted. Mixer console and housing 170, just like the mixer console housing of FIGS. 1 through 4, is pivotally mounted at an upper section thereof to upper portions of sides 110,112 on mutually aligned horizontally extending pivot pins 182,184.

Adjacent to the upper portion of each cover section, on the inside surface thereof, is fixedly mounted a supporting catch or hook 166,168. The hooks 166,168 may be conventional hooks that are adapted to engage an undersurface of the mixer console and housing 170 when the rear section of the latter is swung rearwardly and upwardly to the operable position illustrated in FIG. 8. The two cover door sections 140,141 are swung a small amount further outwardly to allow the control mixer console and housing to pivot upwardly between the two cover sections without interference with the hooks 166 and 168. When the control mixer console and housing has been pivoted outwardly and its lower section is above the hooks 166,168, the two cover sections are moved inwardly to abutment with the sides of the control mixer housing, the mixer console and housing are lowered slightly, and hooks 166,168 are engaged to firmly support the control console mixer and housing in its operable position as illustrated on FIG. 8. In this arrangement the rear portions of the lower edges of the cover sections 140,141 extend rearwardly from the sides 110,112 to provide a relatively large stable base for the assembly. Again, the control mixer console and its sensitive mixing circuits are spaced a relatively long distance from the amplifier from which emanates interfering electromagnetic radiation.

The arrangement illustrated in FIGS. 6, 7 and 8 embodies all of the advantages of the arrangement of FIGS. 1 through 5. It is self-contained, readily portable, and easily set up for operation and reassembled for transportation. No separate table or other support need be carried nor need the operator employ any separate case since the case itself forms the operating support of the instrumentation.

In rearranging the assembly of FIGS. 6 through 8 for operation of the control console the mixer housing is pivoted outwardly and rearwardly to a position slightly above its operable position, and the cover door sections 140,141 are pivoted outwardly slightly beyond their normal operable position. The sides are then moved inwardly after the mixer console and housing have been raised, and the mixer console and housing then are lowered until lower side edges engage the hooks on the inner surface of the cover door sections 140,141. To rearrange the components in condition for handling and transportation the reverse procedure is used. The mixer console and housing are raised slightly to disengage the hooks 166,168, and the cover sections 140,141 are then moved slightly outwardly to allow the console and housing to be pivoted downwardly and inwardly to its stored position between the two sides and adjacent the amplifier. The two cover sections are then swung inwardly to their closed position, as illustrated in FIG. 5. A suitable latching arrangement 134 may be provided to hold the two cover sections in their closed position.

FIGS. 9, 10 and 11 illustrate still another embodiment of the mixer console assembly. This embodiment is very much like the embodiment of FIGS. 1 through 5 in that the cover is completely detachable and cooperates with the sides of the case to form an x-shaped support. In fact, this construction may be substantially identical to the construction of FIGS. 1 through 5, except for the slight modification of the sides of the case to form inclined grooves that slidably receive, guide and hold the cover in its inverted support position. Thus the assembly comprises a substantially completely closed case, including first and second parallel and mutually spaced rigid sides, such as side 210, having an upper portion 210a (FIG. 9) and a fixed lower wall 214. Elements of the embodiment of FIGS. 9 through 11 corresponding to similar elements of FIGS. 1 through 5 are designated by similar reference numerals with the prefix "2" added thereto, so that, for example, side 10 of FIG. 1 through 5 corresponds to side 210 of FIGS. 9 through 11. Between the lower sections of the two sides is mounted a power amplifier casing 216 having an outer wall 224 and an upper wall 218. To the upper end of the sides 210 is pivoted a control console mixer housing 288 having fixed top and bottom walls 230,276 and a back wall 278. Top wall 230 carries at an outer edge one part of a detachable latch 234 which may be identical to the latch 34 of FIGS. 1 through 5. Rigid cover 240, also formed of a continuous rectangular sheet of rigid material, includes an inwardly protruding flange 242 at an upper end thereof. To this flange 242 is fixed a second part of latch 234.

The lower end of the cover, in this arrangement, is merely confined to and at the forward lower edge of lower case or bottom wall 214 by means of an angulated upstanding metal fitting 235 secured to the rear edge of the lower wall 214. Just like the cover of FIGS. 1 through 5, the cover 240 carries on opposite edges of an intermediate portion thereof a pair of laterally outwardly sliding latch bolts of which only one, 266, is shown in FIGS. 9 and 11. Again, these latch bolts perform no useful function when the cover is in closed position, but help to hold the cover in the operable position of FIG. 11. This arrangement also allows the cover to be completely detached from the remainder of the case simply by disconnecting the latch 34 at the top of the assembly and removing the cover from the remainder of the casing.

In the embodiment of FIGS. 9, 10 and 11 a different arrangement is made for holding the cover to the sides in its x-shaped support position. To this end, each side, such as side 210, has an upper portion formed of a double thickness. The upper portion of 210a of side 210 is formed by a first side wall 211 (FIG. 10) which extends for the complete length of the side from top wall 230 to bottom wall 214. However, the upper portion 210a has secured to its inner surface an inner side wall formed of a pair of sections 213,215, each of which is fixedly secured to the upper portion 210a of side 210. The two sections 213 and 215 of the side are separated at a point slightly above the console housing 276 that forms a forward edge of the control console 270. The two side sections 213 and 215 are separated by a distance substantially equal to the-thickness of cover 240 but are separated along a line that is inclined to the length of the side. This separation forms an angled groove 221 (FIG. 10) that extends at an angle to the length of the sides (as best seen in FIG. 11). This groove receives a rigidly affixed reinforcing metal guide channel 223, having flanges fixed to side sections 213 and 215 respectively by means of bolts, such as bolts 217. The upper flange 219 of channel 223 is formed with an aperture 294 that receives the bolt 266 of the slide bolt fixed to the cover. The two sides of the case are identical, each having a reinforced angled groove.

One or more wire receiving grooves 225,227 are routed in the surface of side wall 211 and covered by wall sections of 213 and 215 (FIG. 10) to provide longitudinally extending channels extending from the console pivot 262 down to the interior of the power amplifier case 216. The routed grooves carry connecting electrical leads between the control console and the amplifier via suitable openings in the pivot.

Interengaging stops 297,298 on the wall 218 and wall 276 limit clockwise pivoting of the mixer housing in stored position. A handle 299 fixed to housing wall 276 abuts the inner side of cover 240 in stored position to firmly position the mixer housing. The handle also facilitates pivotal motion of the mixer housing to and from its stored position.

In the assembled condition of FIG. 9 the slide bolts 266 are retracted and the latch 234 is engaged to hold the cover in position and to thereby also hold and protect the included control console and amplifier. To set up the assembly in support condition the cover is removed with the casing in the upright position illustrated in FIG. 9. The control console and housing are then pivoted rearwardly and upwardly, just as in the arrangement of FIGS. 1 through 5, and held in such position manually. The cover is then inserted between the two sides of the casing with the opposite edges of the cover being snugly and slidably received in each of the mutually opposite facing channels 223 that are fixed to the opposite sides of the casing. The cover is moved along the guide channels 223 until the slide bolts 266 of the cover are aligned with the holes 294 in the channel (which holes may also extend into the side sections 213). At this position of the cover relative to the sides the slide bolts are moved outwardly to effectively lock the cover to the sides in the x-shaped support arrangement shown in FIG. 11. The control console housing is then simply lowered to allow its free end to rest upon the free upwardly extending edge of cover flange 242, where the console is held by its own weight. A firm support at widely spaced positions is provided by the contact of the bottom of the cover and the lower edge of the casing with the supporting floor. Moreover, the cover 240 is more securely and rigidly connected to the case sides in support position.

The arrangement of FIGS. 9 through 11 not only locates the cover in its set-up support position longitudinally relative to the sides of the casing, but also maintains the fixed angular relation between the cover and the sides because of the sliding and guiding interengagement of the cover edges with the two guide channels that are fixed to the opposite sides of the casing. Thus a more sturdy, stable and rigid support is provided.

I claim:

1. A portable self supporting control console assembly comprising:
   first and second mutually spaced sides each having an upper portion, a lower portion and rear edges,
   a first structure fixed to and between lower portions of said sides,
   a control console having front and rear sections and positioned between upper portions of said sides in a stored position, said control console front section being pivotally connected to said upper portions of said sides for motion between said stored position in which said control console rear section extends between said sides adjacent said first structure, and an operable position in which said control console rear section extends rearwardly beyond said sides,
   a cover movably connected to said edges in a cover closed position, said cover in said closed position extending between said sides and over both said control console and first structure, said cover being configured and arranged to move between said closed position, when said control console is in said stored position, and a support position in which at least a part of said cover extends rearwardly beyond said edges, and means for supporting said rear section of said control console in said operable position of said control upon said cover in said support position of the cover.

2. The control console assembly of claim 1 wherein said cover is detachable, and wherein said cover, in said support position, extends between said sides at an acute angle thereto, said cover having a lower section adjacent to but spaced in front of the lower portions of said sides, said cover having an upper section adjacent to but spaced behind the upper portion of said sides.

3. The control console assembly of claim 2 wherein said sides each has an inwardly facing guide member extending at an acute angle, said cover having edges received in said guide members of respective ones of said sides in said support position.

4. The control console assembly of claim 2 including latch means for detachably connecting an intermediate portion of said cover in said support position to intermediate portions of said sides.

5. The control console assembly of claim 1 wherein said first structure is a power amplifier and said control console is an audio mixer console, whereby in said operable position said audio mixer console is spaced from said power amplifier.

6. The control console assembly of claim 1 wherein said control console, first structure, sides and cover collectively form a carrying case when said control console is in said stored position and said cover is in said closed position, said control console and said first structure each having a back side that collectively form a cover for said carrying case and that cooperate with said sides and said first mentioned cover to form said carrying case.

7. The control console assembly of claim 1 wherein said cover is detachably connected to said sides, and wherein said cover, in said support position, extends at an acute angle to and between said sides to cooperate therewith to form an "X" shaped assembly, said cover, in said support position, having a bottom section positioned in front of said first structure, and having an upper section positioned behind said upper portions of said sides and engaging the rear section of said control console in said operable position of said control console said means for supporting said rear section in said operable position comprises said upper section of said cover.

8. The control console assembly of claim 7 including guide channels formed in said sides and extending at an acute angle thereto, said cover having side edges received in said guide channels.

9. The control console assembly of claim 1 wherein said cover comprises first and second door sections pivoted to respective rear edges of said first and second sides, said means for supporting said rear section in said operable position comprising first and second support brackets mounted to inner surfaces of said first and second door sections.

10. The control console assembly of claim 9 wherein each said door section extends rearwardly of and in substantial alignment with the side to which it is pivoted.

11. The control console assembly of claim 1 wherein said sides are tilted and cooperate with said cover in said support position to form an X-shaped base for said control console in said operable position of said control console.

12. A portable self supporting and self contained control console assembly comprising:

first and second mutually spaced sides each having an upper portion, a lower portion and rear edges, a first structure connected to and between lower portions of said sides, a movable device having front and rear sections and positioned between upper portions of said sides in a stored position, said device front section being pivotally connected to said upper portions of said sides for motion between said stored position in which said device rear section extends between said sides adjacent said first structure, and an operable position in which said device rear section extends rearwardly beyond said sides, a cover detachably connected to said rear edges, said cover having upper, lower and intermediate portions, said cover being configured and arranged to move between a closed position, when said device is in said stored position, in which said cover extends between said sides and over both said movable device and first structure, and a support position, when said device is in said operable position, in which said upper portion of said cover extends rearwardly beyond said rear edges, said intermediate portion of said cover extends between and is detachably connected to intermediate portions of said sides, and said lower portion of said cover extends forwardly of said lower portions of said sides to cooperate therewith to provide a supporting base, and means for supporting said rear section of said device in said operable position of said device upon said cover in said support position of said cover.

13. The assembly of claim 12 wherein said cover, in said support position, extends between said sides at an acute angle thereto and cooperates with said sides to form an X-shaped support for said device.

14. The assembly of claim 13 including latch means for detachably connecting said intermediate portion of said cover in said support position to intermediate portions of said sides.

15. The assembly of claim 12 wherein said sides each has an inwardly facing guide member extending at an acute angle, said cover having edges received in said guide members of respective ones of said sides in said support position.

16. The assembly of claim 12 wherein said first structure is a power amplifier and said device is an audio mixer console, whereby in said operable position said audio mixing console is spaced from said power amplifier.

17. The assembly of claim 12 wherein said sides and cover collectively form a carrying case when said device is in said stored position and said cover is in said closed position, said device having a back side that forms at least part of a second cover for said carrying case and that cooperates with said sides and first mentioned cover to form said carrying case.

18. The assembly of claim 12 wherein said sides are tilted and cooperate with said cover in said support position to form an X-shaped base for said device in the operable position of the device, said sides having inwardly facing guide channels extending at an acute angle and respectively receiving side edges of said cover.

19. A portable self-supporting control console assembly comprising:

first and second mutually spaced sides each having an upper portion, a lower portion and rear edges, a first structure fixed to and between lower portions of said sides, a control console having front and rear sections positioned between upper portions of said sides in a stored position, said control console front section being pivotally connected to said upper portions of said sides for motion between said stored position in which said control console rear section extends between said sides adjacent said first structure and an operable position in which said control console rear section extends rearwardly beyond said sides, first and second cover door sections each pivotally connected to a respective one of said first and second spaced sides and movable between a closed position in which both of said cover door sections lie in a common plane between said rear edges of said first and second sides and extend over said control console and first structure when said control console is in its stored position, and a support position in which each door section extends rearwardly and outwardly of a respective one of said first and second sides in substantial alignment with said sides, and latch means on inner surfaces of said cover door sections configured and arranged to cooperate with said control console in its operable position to support said rear section of said control console.

* * * * *